(12) United States Patent
Hull

(10) Patent No.: US 12,149,128 B2
(45) Date of Patent: Nov. 19, 2024

(54) AXIAL FLUX MOTOR HAVING RECTILINEAR STATOR TEETH

(71) Applicant: WHIRLPOOL CORPORATION, Benton Harbor, MI (US)

(72) Inventor: James B. Hull, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 77 days.

(21) Appl. No.: 17/733,022

(22) Filed: Apr. 29, 2022

(65) Prior Publication Data

US 2022/0263355 A1    Aug. 18, 2022

Related U.S. Application Data

(62) Division of application No. 16/576,221, filed on Sep. 19, 2019, now Pat. No. 11,355,974.

(51) Int. Cl.
*H02K 1/2793* (2022.01)
*H02K 1/14* (2006.01)
(Continued)

(52) U.S. Cl.
CPC ............ *H02K 1/2793* (2013.01); *H02K 1/146* (2013.01); *H02K 3/345* (2013.01); *H02K 21/026* (2013.01);
(Continued)

(58) Field of Classification Search
CPC ........ H02K 1/146; H02K 7/14; H02K 15/022; H02K 15/12; H02K 21/24; H02K 3/32; H02K 15/066; H02K 1/2793; H02K 1/2795; H02K 1/2796; H02K 1/2798; H02K 1/182; H02K 21/026; H02K 37/08; H02K 37/125; H02K 3/34; H02K 3/345; D06F 21/02; D06F 37/36; F04D 29/528
(Continued)

(56) References Cited

U.S. PATENT DOCUMENTS 6,445,105 B1   9/2002   Kliman et al.
6,809,453 B2   10/2004  Narita et al.
(Continued)

FOREIGN PATENT DOCUMENTS

EP     887908 A1 * 12/1998 ........... H02K 1/2793
JP     2015186366 A   10/2015
(Continued)

OTHER PUBLICATIONS

Okamoto Kazuo, Axial Gap Type Rotary Electric Machine, Oct. 22, 2015, JP 2015186366 (English Machine Translation) (Year: 2015).*

*Primary Examiner* — Alexander A Singh
(74) *Attorney, Agent, or Firm* — Price Heneveld LLP

(57) ABSTRACT

An axial flux motor for an appliance includes a stator yoke. A plurality of stator teeth extend from the stator yoke in an axial direction and are positioned about a central rotational axis. Each stator tooth includes a plurality of laminations that extend in the axial direction and form a "T" shaped member. The plurality of stator teeth are overmolded with a polymeric material to define a plurality of axial stator poles. At least one winding extends around the plurality of axial stator poles. A ring-shaped rotor rotates about the central rotational axis of the stator yoke. The rotor is positioned proximate an axial end of the plurality of axial stator poles.

20 Claims, 10 Drawing Sheets

(51) Int. Cl.
    *H02K 3/34*            (2006.01)
    *H02K 21/02*          (2006.01)
    *D06F 21/02*          (2006.01)
    *D06F 37/36*          (2006.01)
    *F04D 29/52*          (2006.01)
    *H02K 7/14*            (2006.01)
    *H02K 15/02*          (2006.01)
    *H02K 15/12*          (2006.01)
    *H02K 21/24*          (2006.01)

(52) U.S. Cl.
    CPC .............. *D06F 21/02* (2013.01); *D06F 37/36* (2013.01); *F04D 29/528* (2013.01); *H02K 7/14* (2013.01); *H02K 15/022* (2013.01); *H02K 15/12* (2013.01); *H02K 21/24* (2013.01)

(58) Field of Classification Search
    USPC ........................................................ 310/268
    See application file for complete search history.

(56) References Cited

U.S. PATENT DOCUMENTS

| | | |
|---|---|---|
| 7,550,894 B2 | 6/2009 | Hino et al. |
| 9,287,739 B2 | 3/2016 | Ashe et al. |
| 9,391,499 B2 | 7/2016 | Kim |
| 9,391,500 B2 | 7/2016 | Smith et al. |
| 10,027,212 B2 | 7/2018 | Back et al. |
| 2004/0061396 A1 | 4/2004 | Narita et al. |
| 2006/0145562 A1 | 7/2006 | Nakayama |
| 2006/0152104 A1 | 7/2006 | Hino et al. |
| 2007/0138904 A1 | 6/2007 | Chae |
| 2007/0290582 A1 | 12/2007 | Han et al. |
| 2010/0225195 A1 | 9/2010 | Asano et al. |
| 2010/0275660 A1 | 11/2010 | Yoon et al. |
| 2011/0020154 A1* | 1/2011 | Matsuda ................ H02K 3/325 310/43 |
| 2011/0025161 A1 | 2/2011 | Ashe et al. |
| 2013/0069467 A1 | 3/2013 | Smith et al. |
| 2014/0042852 A1 | 2/2014 | Lee et al. |
| 2019/0149002 A1 | 5/2019 | Kim et al. |
| 2019/0288584 A1 | 9/2019 | Vansompel et al. |
| 2021/0091608 A1 | 3/2021 | Hull |
| 2022/0263355 A1* | 8/2022 | Hull ..................... H02K 15/066 |

FOREIGN PATENT DOCUMENTS

| | | |
|---|---|---|
| WO | 2013084614 A1 | 6/2013 |
| WO | 2018015293 A1 | 1/2018 |

\* cited by examiner

AXIAL FLUX MOTOR HAVING RECTILINEAR STATOR TEETH

CROSS-REFERENCE TO RELATED APPLICATION

The present application is a divisional of U.S. patent application Ser. No. 16/576,221 filed Sep. 19, 2019, now U.S. Pat. No. 11,355,974, entitled "AXIAL FLUX MOTOR HAVING RECTILINEAR STATOR TEETH," the entire disclosure of which is hereby incorporated herein by reference.

FIELD OF THE DEVICE

The device is in the field of electric motors, and more specifically, an axial flux motor that includes stator teeth having a rectilinear configuration that is generally in a "T" configuration.

SUMMARY OF THE DEVICE

According to one aspect of the present disclosure, an electric motor includes a stator yoke. A plurality of stator teeth extend axially from the stator yoke. Each stator tooth includes a first rectilinear member and a second rectilinear member. The plurality of stator teeth are overmolded with a polymeric material to define a plurality of axial stator poles. At least one winding extends around the plurality of axial stator poles. A rotor rotates about a central axis of the stator yoke. The rotor is positioned proximate an axial end of the plurality of stator teeth.

According to another aspect of the present disclosure, an axial flux motor for a laundry appliance includes a stator yoke. A plurality of stator teeth extend from the stator yoke in an axial direction and are positioned about a central rotational axis. Each stator tooth includes a plurality of laminations that extend in the axial direction and form a "T" shaped member. The plurality of stator teeth are overmolded with a polymeric material to define a plurality of axial stator poles. At least one winding extends around the plurality of axial stator poles. A ring-shaped rotor rotates about the central rotational axis of the stator yoke. The rotor is positioned proximate an axial end of the plurality of axial stator poles.

According to yet another aspect of the present disclosure, a method for forming an axial flux motor includes connecting a plurality of first laminations to form a first rectilinear member. A plurality of second laminations are connected to form a second rectilinear member. The first and second rectilinear members are positioned in a "T" shaped configuration to define a stator tooth. An overmold material is disposed over the first and second rectilinear members to define an axial stator pole. The axial stator pole is positioned within a stator yoke to form a stator core.

These and other features, advantages, and objects of the present disclosure will be further understood and appreciated by those skilled in the art by reference to the following specification, claims, and appended drawings.

Figure 1:
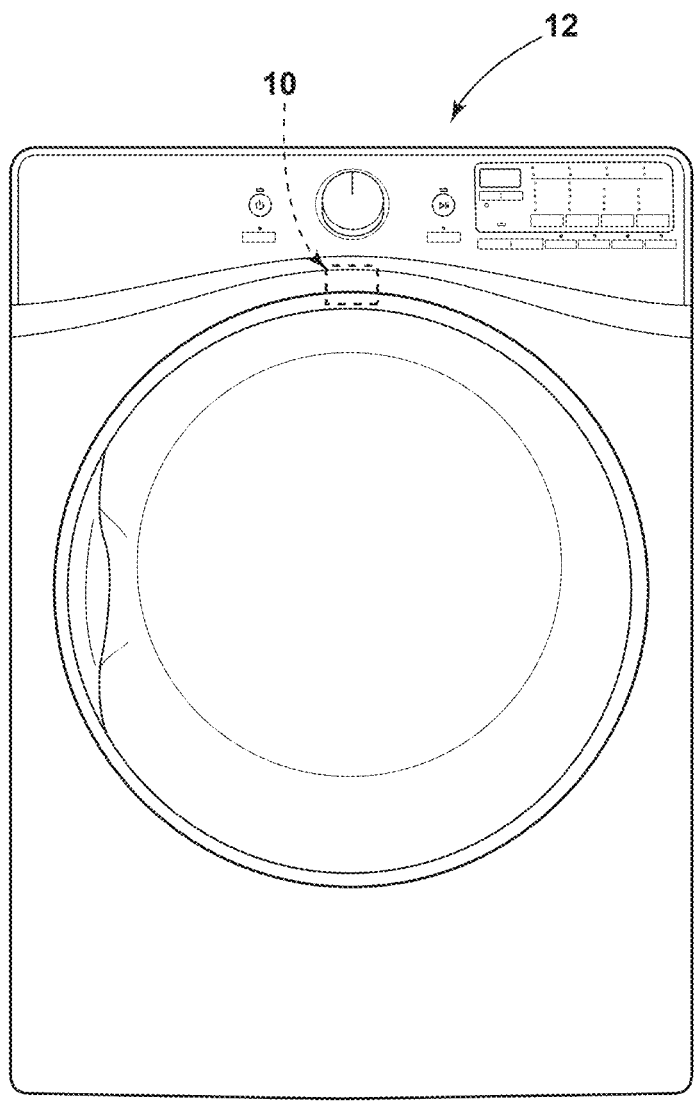
FIG. 1 is a front elevational view of a laundry appliance that incorporates an aspect of the axial flux motor.

The components in the figures are not necessarily to scale, emphasis instead being placed upon illustrating the principles described herein.

DETAILED DESCRIPTION

The present illustrated embodiments reside primarily in combinations of method steps and apparatus components related to an axial flux motor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With respect to FIGS. 1-8, reference numeral 10 generally refers to an axial flux motor that is incorporated within an appliance 12 for operating various mechanical assemblies 14 within the appliance 12. Typically, the axial flux motor 10 can be used within a laundry appliance 12 for operating assemblies having low-voltage requirements, such as fluid pumps, fans, and other similar assemblies. According to various aspects of the device, the electric motor 16 in the form of the axial flux motor 10 includes a stator yoke 18 and a plurality of stator teeth 20 that extend axially from the stator yoke 18. Each stator tooth 20 includes a first rectilinear member 22 and a second rectilinear member 24. The plurality of stator teeth 20 are overmolded with a polymeric material 26 to define a plurality of axial stator poles 28. These axial stator poles 28 are engaged with the stator yoke 18 to define a stator core 30. At least one winding 32 extends around the plurality of axial stator poles 28. Typically, a plurality of windings 32 are positioned around the axial stator poles 28 to define a single phase motor or a multiple phase motor for use within the laundry appliance 12. A rotor 34 rotates about a central axis 36 of the stator yoke 18. The rotor 34 is positioned proximate an axial end 38 of the plurality of stator teeth 20. Accordingly, when the windings 32 are energized through the selective application of an electrical current 40, the stator core 30 generates a magnetic field that cooperates with the magnetic material of the rotor 34 to produce an electromotive force 42 that rotates the rotor 34 with respect to the stator core 30.

Because the rotor 34 is positioned at the axial end 38 of the plurality of stator teeth 20, the axial flux motor 10 typically occupies a small and compact space 72 for use within smaller assemblies. Within these assemblies, the rotor 34 can be attached to a rotating member 44 that rotationally operates about the central axis 36 of the stator yoke 18 and the stator core 30. This rotating member 44 can be in the form of an impeller for a fluid pump, a fan blade, or other similar rotating member 44 that can be used within an appliance 12, such as a laundry appliance.

Figure 3:
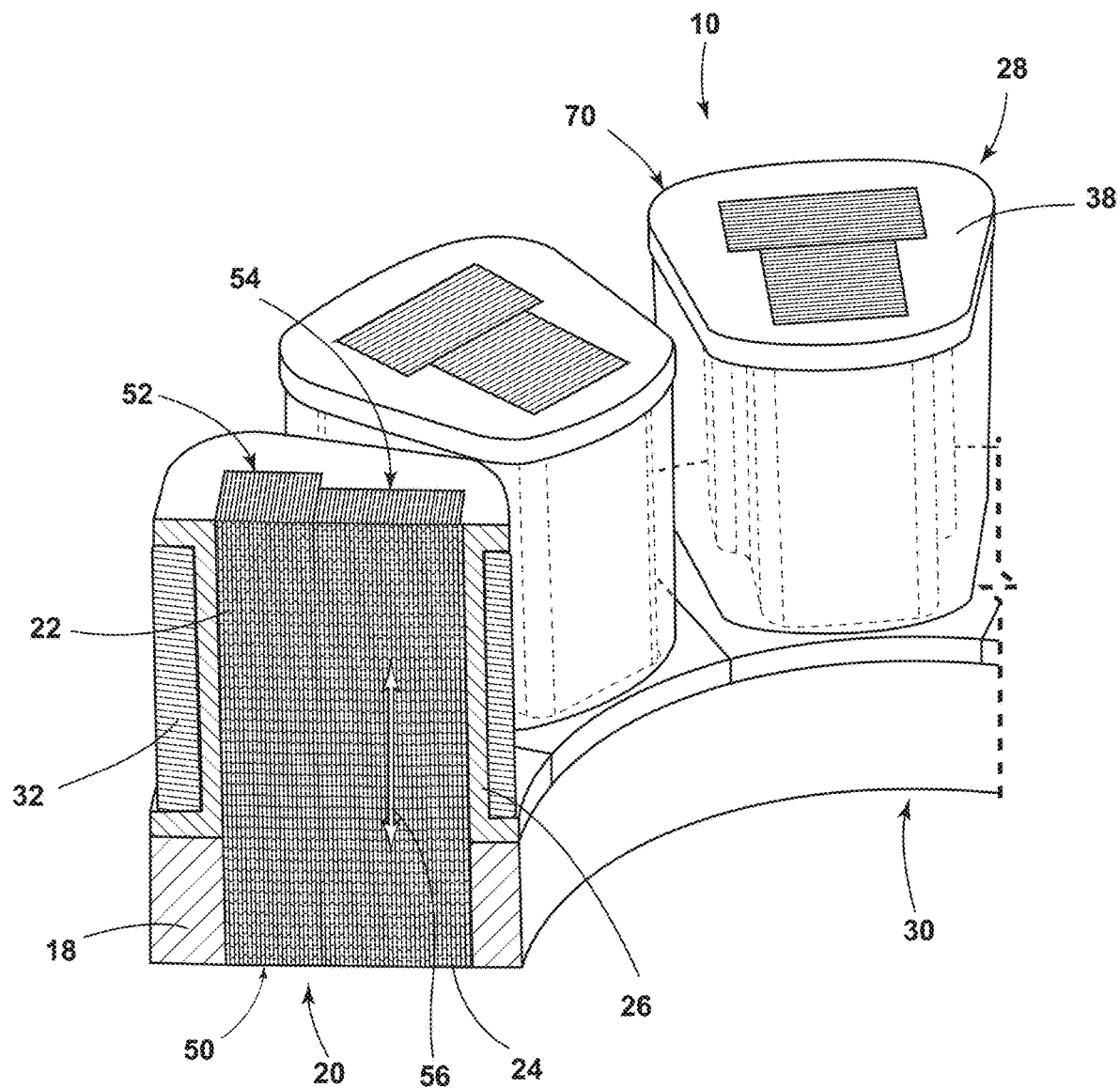
FIG. 3 is a cross-sectional view of the stator core of FIG. 2 taken along line III-III.
Figure 4:
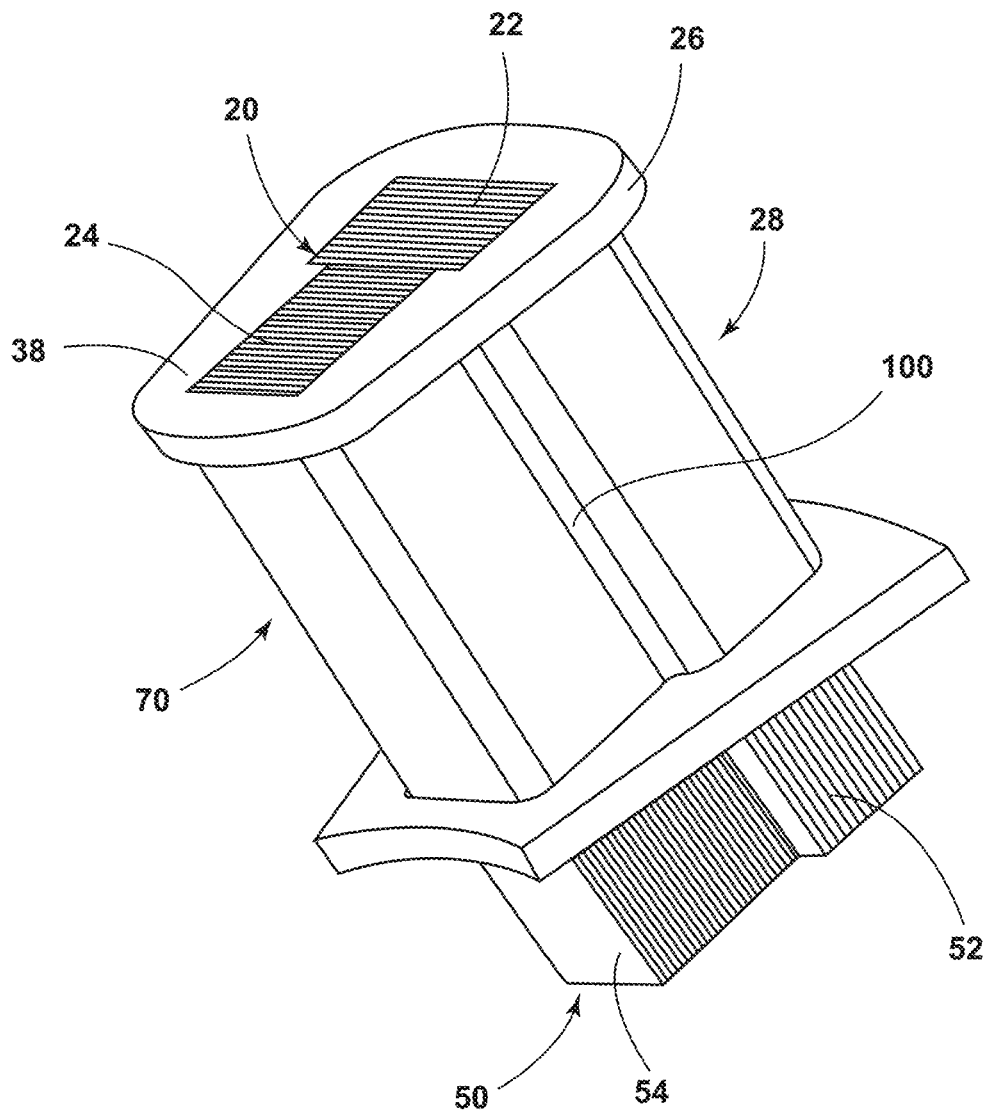
FIG. 4 is a side perspective view of a single axial stator pole showing the "T" shaped stator tooth and the polymeric overmold.

Referring now to FIGS. 3 and 4, the first and second rectilinear members 22, 24 that form each stator tooth 20 include a plurality of laminations 50 that are oriented perpendicular to the stator yoke 18. In this manner, the first rectilinear member 22 includes a first set 52 of laminations 50 that are attached together in a layered configuration and the second rectilinear member 24 includes a second set 54 of laminations 50 that are also attached together in a layered configuration to form the first and second rectilinear members 22, 24. The laminations 50 can be adhered together, attached together via fasteners, overmolded together and coupled via other similar mechanisms and methods. These first and second rectilinear members 22, 24 are positioned to be in a perpendicular configuration with respect to one another to form an extruded "T" shape that extends in an axial direction 56 from the stator yoke 18. The orientation of these laminations 50 as extending in an axial direction 56 from the stator yoke 18 directs the magnetic flux from the energized winding 32 toward the rotor 34 to produce the electromotive force 42 that operates the rotor 34 with respect to the stator. Typically, the various laminations 50 are oriented in a similar orientation such that the laminations 50 of the first and second sets 52, 54 are parallel with one another. In this parallel configuration, the first and second rectilinear members 22, 24 maintain the "T" shape that forms each stator tooth 20. These laminations 50 are typically made from a ferromagnetic material, such as iron, that can be made from using a plurality of stamped laminations 50 that are adhered to one another to form the first and second rectilinear members 22, 24.

Within conventional axial flux motors, the stator teeth are in the form of a generally triangular prism where the laminations extend axially from the yoke for the stator. To form this triangular-shaped tooth, each of the laminations must have a different size to accommodate the triangular shape that flares outward and away from the center of the yoke for the stator. Accordingly, within conventional axial flux motors, each stator tooth includes a large number of separately-sized laminations that must be oriented within a specific configuration to achieve the triangular-shape of the stator tooth. This process can be very time consuming, costly, and can result in a significant amount of wasted resources.

Figure 9:
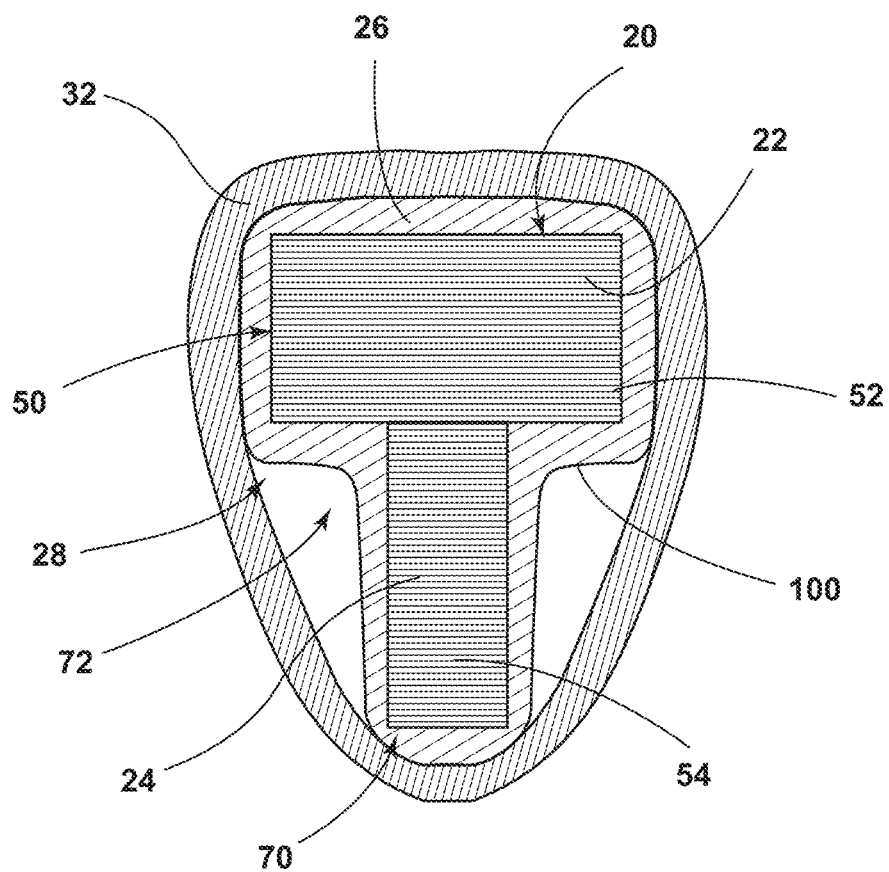
FIG. 9 is a schematic cross-sectional view of an axial stator pole showing the configuration of the winding extending around the axial stator pole.
Figure 10:
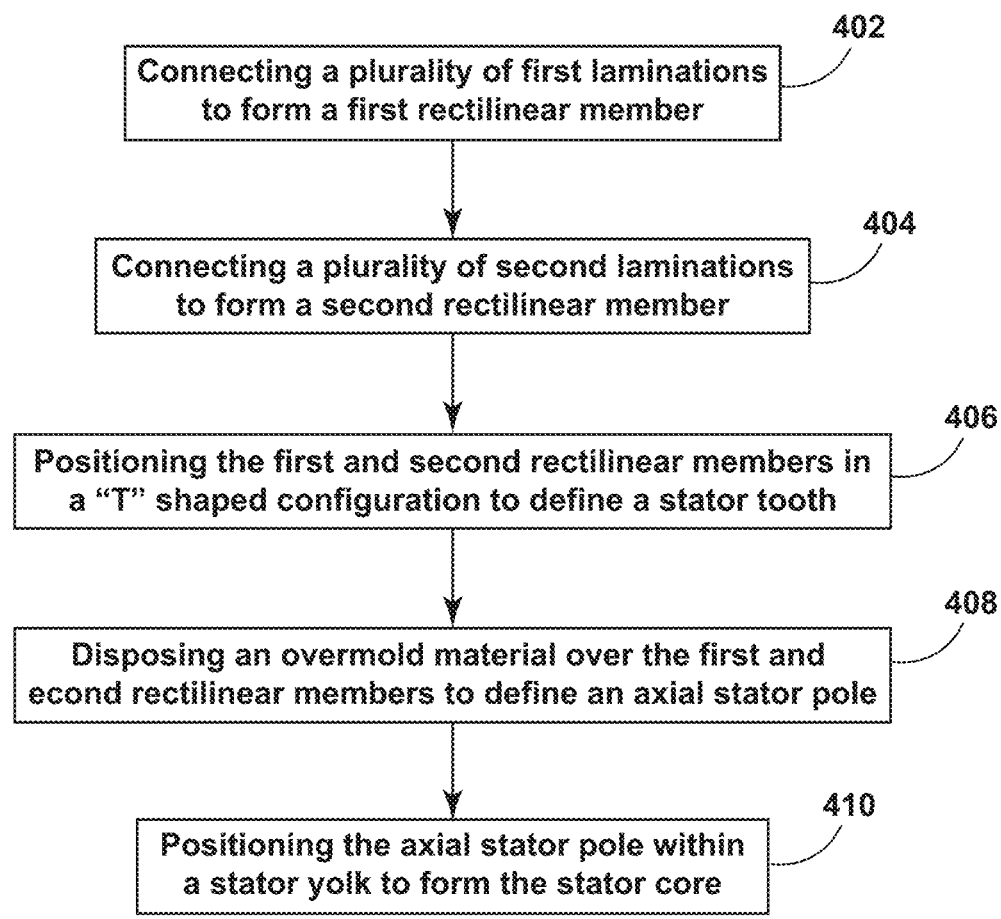
FIG. 10 is a linear flow diagram illustrating a method for forming an axial flux motor.

Within the axial flux motor 10 described herein, the first and second rectilinear members 22, 24 are positioned to form the "T" configuration of the stator tooth 20. When the winding 32 is applied to the polymeric overmold 70 of these axial stator poles 28, spaces 72 (shown in FIG. 9) may remain between the winding 32 and the polymeric overmold 70 of these axial stator poles 28. These spaces 72 may result in a diminished electromotive force 42, which may result in a voltage inefficiency or may require a slightly increased electrical current 40 that may be required to be delivered to the windings 32 of the axial flux motor 10. Because the axial flux motor 10 is used for devices that have a very minimal electrical requirement, the voltage inefficiencies that may result therefrom may represent only a small percentage of an already low electrical requirement. Again, the axial flux motor 10 described herein is typically used for low-voltage mechanisms that require low speeds for operation during use.

As exemplified in FIGS. 2-9, the first and second rectilinear members 22, 24 of the stator teeth 20 include first and second sets 52, 54 of laminations 50 that are positioned in a rectangular formation that are combined to define the "T" shape of each stator tooth 20. It is contemplated that the first and second rectilinear members 22, 24 may include the same dimensions such that a single sized lamination 50 is required for each of the first and second rectilinear members 22, 24. It is also contemplated that the first and second rectilinear members 22, 24 may have different widths and may include different numbers of laminations 50 such that the first and second rectilinear members 22, 24 may have different dimensional sizes. In each of these configurations, the first and second rectilinear members 22, 24 are formed by stacks of similarly and consistently-sized laminations 50 that are positioned in an axial direction 56 with respect to the stator yoke 18 to form the stator core 30 for the axial flux motor 10. By using a consistent sized lamination 50 for each of the first and second rectilinear members 22, 24, manufacture of the stator teeth 20 for the axial flux motor 10 is a far more efficient operation that results in far less waste and use of resources.

According to various aspects of the device, the axial flux motor 10 described herein can be coupled with a controller 80 to provide a consistent speed or a variable speed operation with respect to a fan, fluid pump or other similar mechanical assembly 14. This variation in speed can be used to provide a quiet overnight operation, such as an overnight dry function that allows a fan blade to be operated at a low speed through an extended idle period. Additionally, the smaller footprint of the axial flux motor 10 allows the axial flux motor 10 to be positioned within a limited space 72. Such limited space 72 may be found between a tub for a laundry appliance 12 and the outer cabinet for that laundry appliance 12.

As exemplified in FIGS. 2-9, the laminations 50 for the stator teeth 20 can be made from a ferromagnetic material such as steel, powder metal, and other similar ferrous material typically used within electrical stators. Additionally, the stator yoke 18 can also be made of various materials that can include powder metal, steel, and other similar materials. The stator yoke 18 can also be formed of a plurality of stacked laminations 50.

Figure 5:
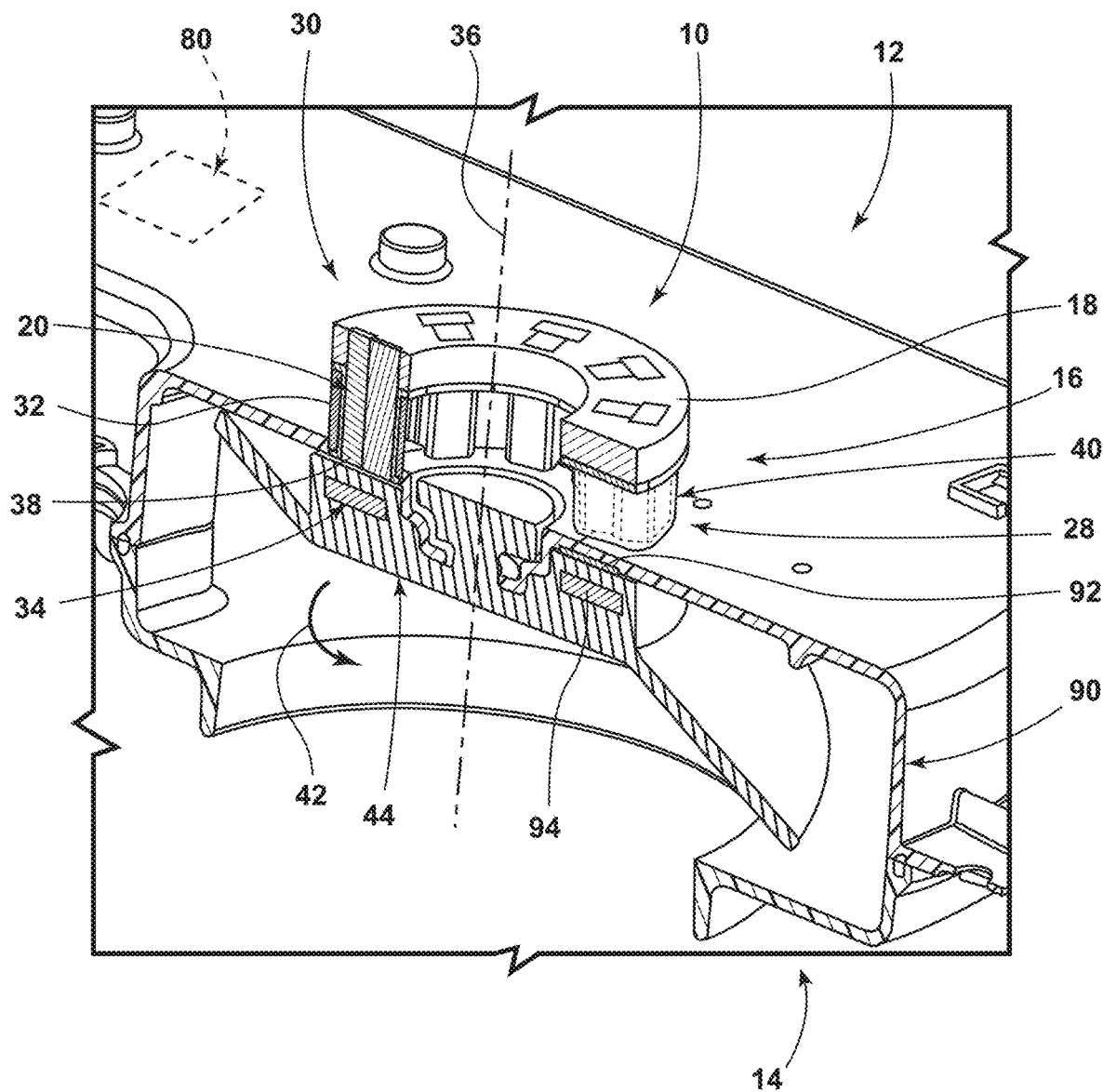
FIG. 5 is a cross-sectional perspective view of a structural assembly that incorporates an aspect of the axial flux motor, and showing the axial stator poles incorporated within the structural housing.

As exemplified in FIG. 5, the axial flux motor 10 can be coupled with a structural housing 90 for an assembly, such as a fluid pump, fan, or other similar assembly. The stator core 30 for the axial flux motor 10 can be overmolded with a polymeric material 26, such as bulk molding compound (BMC) to attach the stator core 30 to the structural housing 90. In such an embodiment, the stator core 30 can include a second overmold 92 in the form of the BMC that extends around the plurality of axial stator poles 28 and the stator yoke 18 for attaching the stator core 30 to the structural housing 90. It is also contemplated that the stator core 30 can be integrated within the structure, where the axial stator poles 28 may extend at least partially into or through a portion of the structural housing 90 for the mechanical assembly 14.

Referring again to FIG. 5, when the stator core 30 is attached to the structural housing 90, the rotor 34 can be positioned proximate the axial ends 38 of the plurality of axial stator poles 28. As exemplified in FIG. 5, the rotor 34 may be positioned within the structural housing 90 and the stator core 30 may be positioned at least partially outside of the structural housing 90. During operation of the axial flux motor 10, the electromotive force 42 is delivered to the rotor 34 via the windings 32 and the axial stator poles 28 for creating the electromagnetic field and producing the electromotive force 42 that operates the rotor 34 with respect to the stator. As discussed above, this electromotive force 42 can be used to operate the rotor 34 that is attached to various rotational items such as a fan blade, an impeller for a fluid pump, and other similar items. These items are typically light in weight such that a minimal amount of electrical current 40 is required to produce the magnitude of electromotive force 42 for operating the rotor 34 and the rotating member 44 that is coupled with the rotor 34.

By way of example, and not limitation, as exemplified in FIG. 5, the magnet 94 of the rotor 34 can be overmolded as part of the fan blade assembly. In such an embodiment, the fan blade assembly can be attached to a bearing that positions the rotor 34 of the fan blade assembly proximate the axial ends 38 of the plurality of axial stator poles 28. Accordingly, when the windings 32 for the axial flux motor 10 are energized, the resulting electromotive force 42 operates magnets 94, such as a ring magnet 94, of the rotor 34 to rotate about the central rotational axis. In turn, operation of the rotor 34 results in rotation of the fan blade about the same rotational axis. In certain aspects of the device, the magnet 94 for the rotor 34 can include various configurations. These configurations can include, but are not limited to, a Halbach array, a single-piece ring magnet, a plurality of magnets that form a ring shape, a magnet assembly having a back iron for the rotor 34, and other similar configurations.

Where the rotor 34 is used as part of a fan blade assembly, the configuration of the axial flux motor 10 can be used in connection with a fan blade having an increased pitch of each of the blades due to the increased sped of the rotor 34, and, in turn, the fan blade. An increased pitch can be useful in avoiding clogging as a result of lint particles that are present within the laundry appliance 12 during operation. The increased pitch of the individual fan blades allows for more space 72 for the lint particles to pass by the individual fan blades to prevent clogging.

Referring again to FIGS. 2-9, first and second rectilinear members 22, 24 are shown with respect to each stator tooth 20 of the axial flux motor 10. It is contemplated that additional rectilinear members can be used to produce additional steps 100 and corresponding spaces 72 within each stator tooth 20. Typically, each stator tooth 20 will include a first rectilinear member 22 and a second rectilinear member 24 that are positioned with the laminations 50 that are generally parallel with one another. The first and second rectilinear members 22, 24 are also positioned to produce the "T" shape of the stator tooth 20.

Referring again to FIGS. 1-9, the axial flux motor 10 for the laundry appliance 12 includes the stator yoke 18 and the plurality of stator teeth 20 that extend from the stator yoke 18 in the axial direction 56. These stator teeth 20 are positioned about a central rotational axis and each stator tooth 20 includes a plurality of laminations 50 that extend in the axial direction 56 to form a "T" shaped member. As discussed above, this "T" shaped member is typically formed by the first rectilinear member 22 and the second rectilinear member 24 that are positioned perpendicular with respect to one another to form the "T" shape. In this "T" shape, the laminations 50 of the first and second rectilinear members 22, 24 are oriented parallel with one another throughout the entire stator tooth 20. The plurality of stator teeth 20 are overmolded with a polymeric material 26 to define the plurality of axial stator poles 28 that extend in the axial direction 56 from the stator yoke 18. The winding 32 can then be positioned around the plurality of axial stator poles 28 in a single phase, or multi-phase configuration. The configuration of the windings 32 and the controller 80 for delivering the various electrical currents 40 to these windings 32 can result in a single speed axial flux motor 10 or a variable speed axial flux motor 10.

A ring-shaped rotor 34 is configured to include magnets 94 that rotate about the central rotational axis of the stator yoke 18. The rotor 34 is positioned proximate the axial end 38 of the plurality of axial stator poles 28. Through this configuration, the magnetic field produced through energizing the windings 32 results in the electromotive force 42 that operates the rotor 34 with respect to the stator core 30. In various configurations of the device, the axial flux motor 10 can be controlled to operate as a variable speed motor and in both clockwise and counter-clockwise directions. The axial flux motor 10 can also be configured as a single speed and single direction motor or a variable speed and single direction motor.

Figure 2:
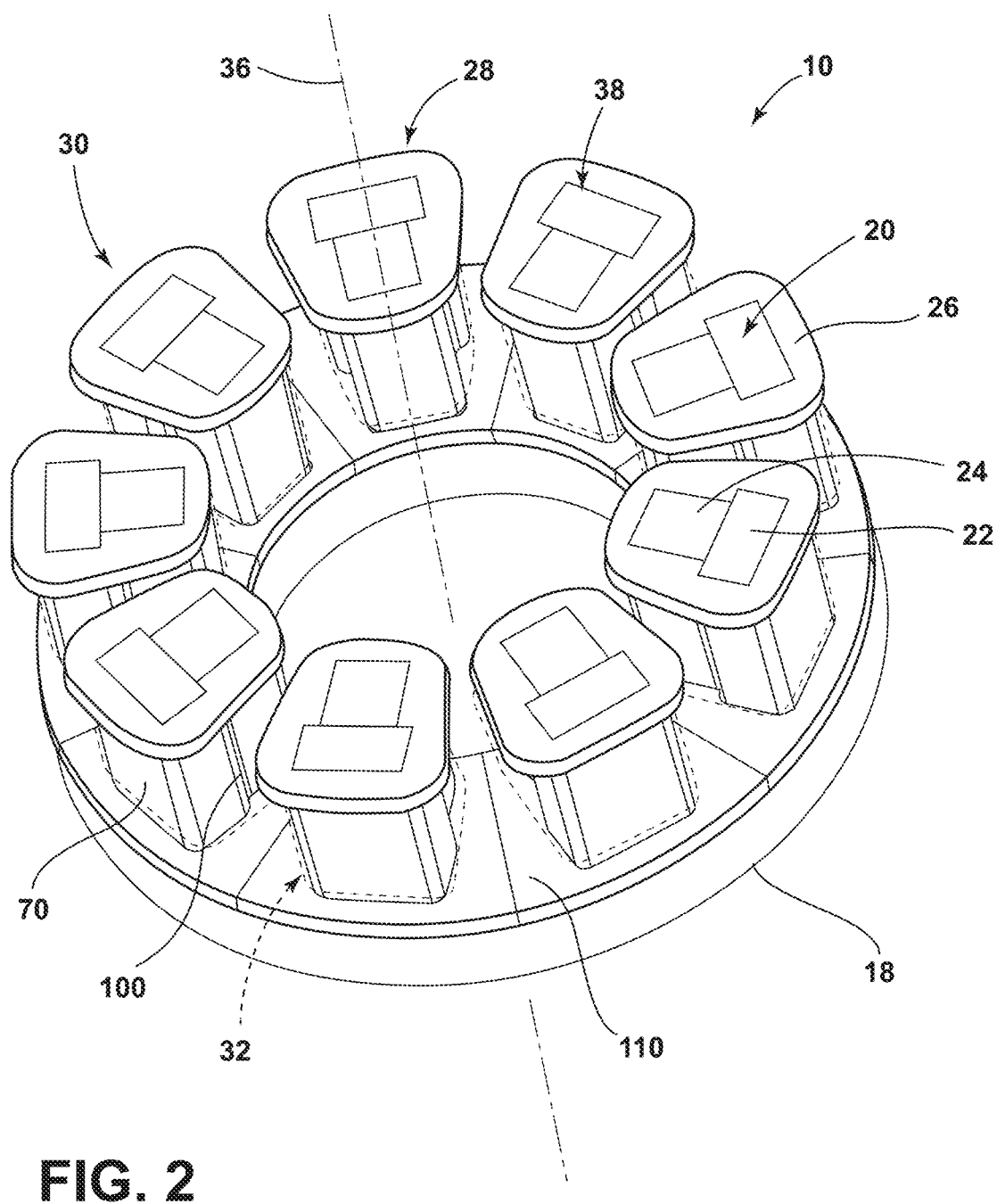
FIG. 2 is a side perspective view of an aspect of a stator core for the axial flux motor and shown without the windings.

Referring now to FIGS. 2-4, each axial stator pole 28 can be individually manufactured and inserted within a respective aperture 122 of a plurality of apertures 122 defined within the stator yoke 18. In such a configuration, the first and second rectilinear members 22, 24 are positioned within a mold and the polymeric overmold 70 is positioned around the stator tooth 20 to produce the axial stator pole 28. Each axial stator pole 28 can include a spacing flange 110 that engages a yoke surface 112 of the stator yoke 18 and also helps to laterally position each axial stator pole 28 with respect to the adjacent axial stator poles 28. To secure the axial stator poles 28 to the stator yoke 18, the second overmold 92 can be positioned around the plurality of axial stator poles 28 and the stator yoke 18 to form a unitary assembly of the stator core 30.

Figure 6:
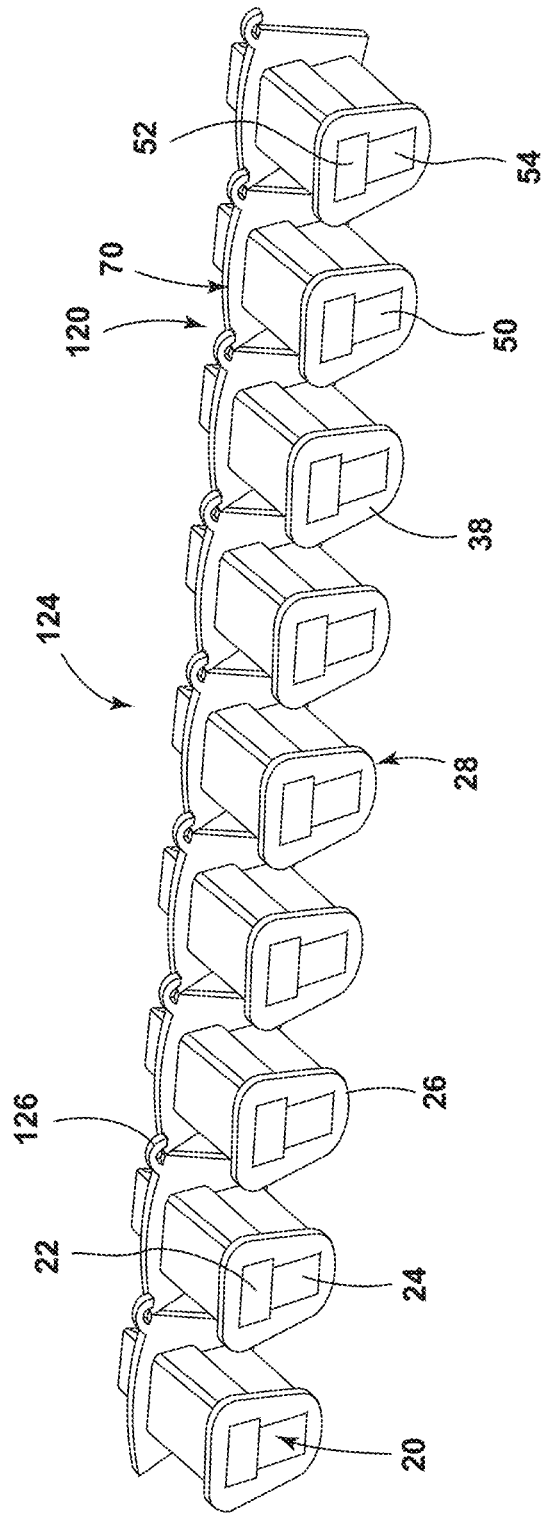
FIG. 6 is a side perspective view of an aspect of the plurality of axial stator poles shown as formed in a linear configuration and including a plurality of living hinges.
Figure 7:
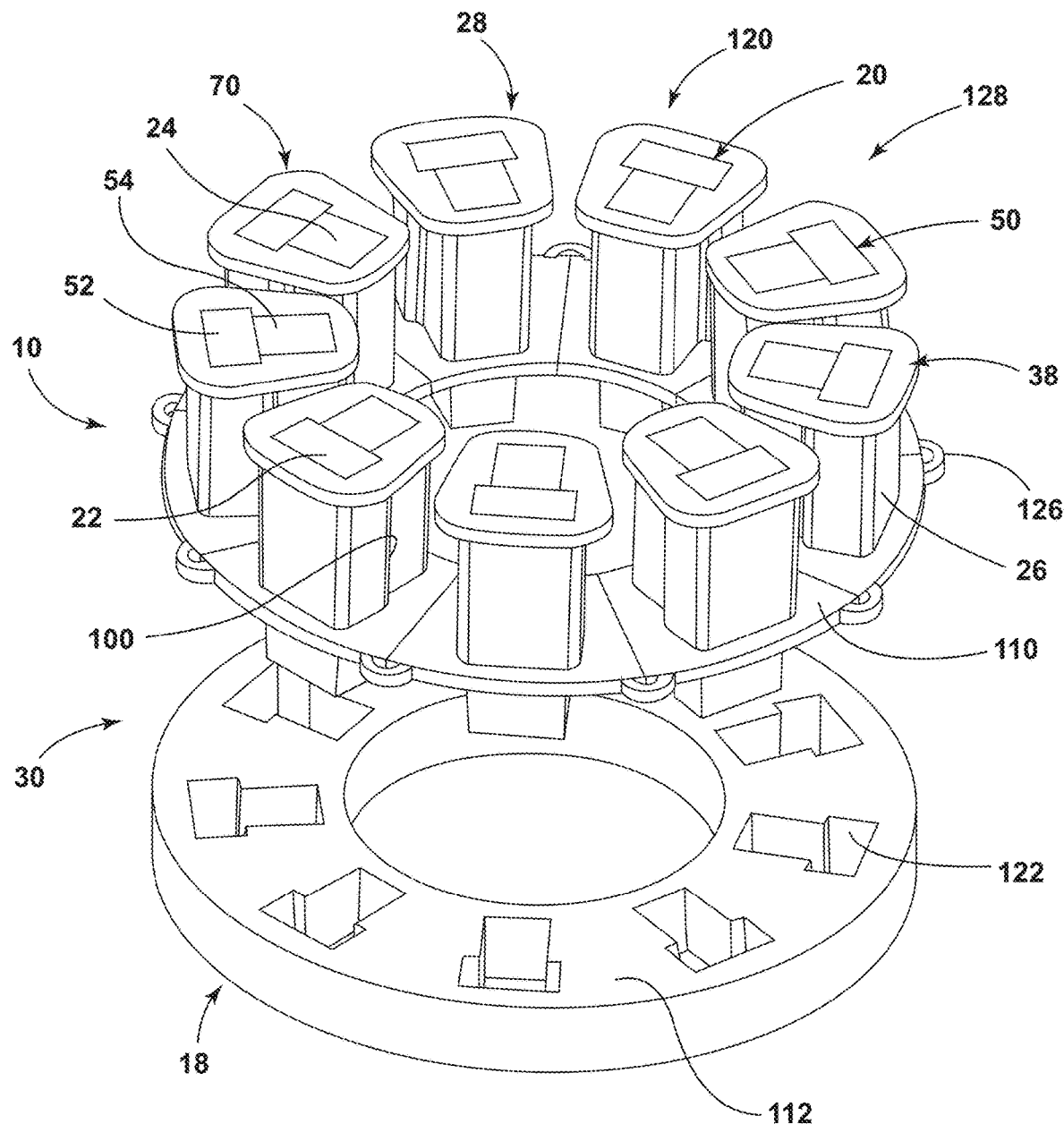
FIG. 7 is a partially exploded perspective view of the plurality of axial stator poles manipulated in a circular configuration and positioned for installation on the stator yoke to form the stator core for the axial flux motor.
Figure 8:
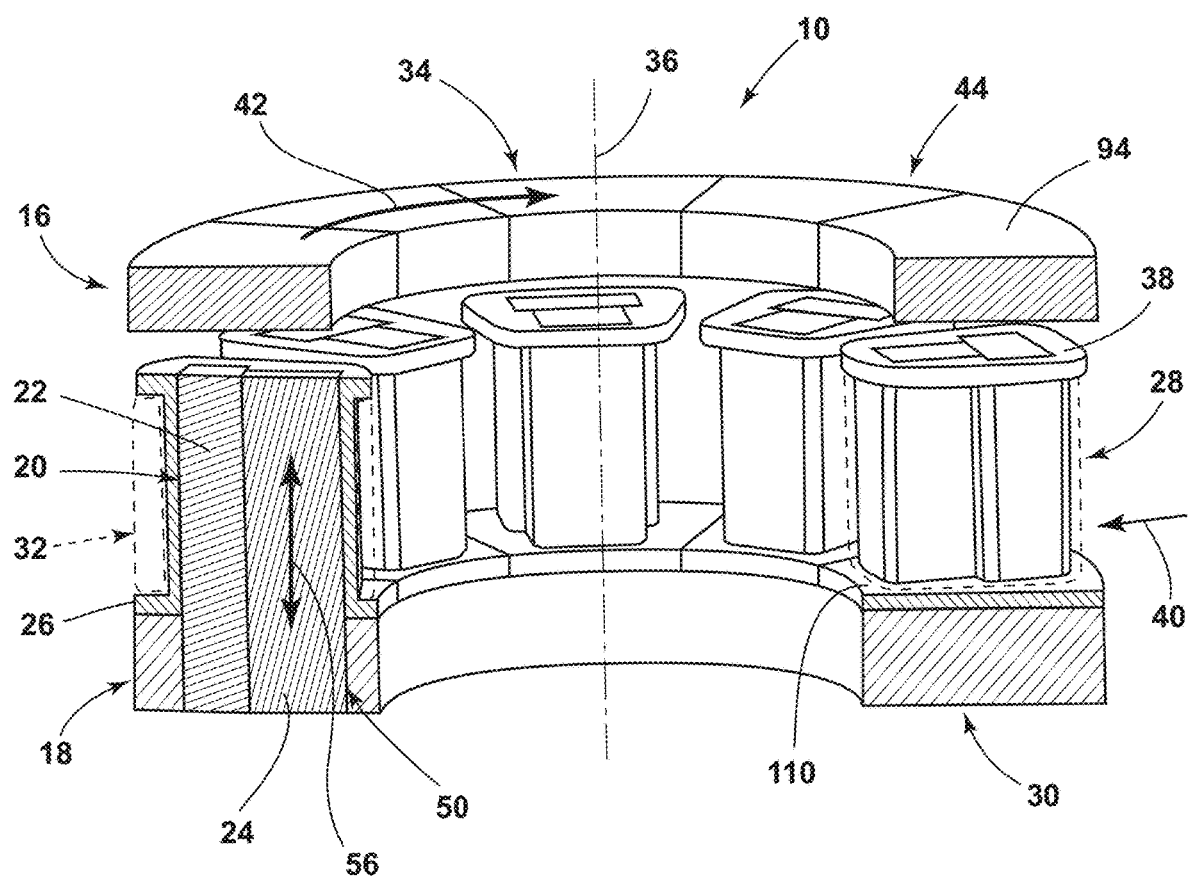
FIG. 8 is a cross-sectional view of an aspect of the axial flux motor and showing the positioning of the rotor with respect to the stator core for the axial flux motor.

Referring now to FIGS. 6 and 7, the plurality of axial stator poles 28 are overmolded using the polymeric material 26 to define a single flexible unit 120 that may be slidably engaged within the apertures 122 defined within stator yoke 18. In such an embodiment, the stator teeth 20 can be positioned in an elongated and typically linear configuration 124 and the polymeric material 26 can be overmolded while the stator teeth 20 are in this linear configuration 124. Each of the axial stator poles 28 can be coupled via a living hinge 126 that allows for manipulation of the plurality of axial stator poles 28 from the linear configuration 124 to a circular configuration 128 for insulation within the stator yoke 18. As exemplified in FIG. 6, each living hinge 126 is positioned between adjacent axial stator poles 28 to allow for manipulation of this linear configuration 124 of the axial stator poles 28.

In this linear configuration 124 of the axial stator poles 28, the process of positioning the windings 32 can be accomplished. In the linear configuration 124, exemplified in FIG. 6, the mechanism for positioning the windings 32 can operate along the linear path of the axial stator poles 28. Once the positioning of the windings 32 is completed, the linear configuration 124 of the axial stator teeth 20 can be manipulated, along with the windings 32, into the circular configuration 128 for positioning on the stator yoke 18. The process of adding the windings 32 while the axial stator poles 28 are in the linear configuration 124 is less complicated and more efficient than positioning the windings 32 on radially positioned stator teeth 20.

As exemplified in FIG. 7, these axial stator poles 28, along with the windings 32, can be formed into a circular shape such that each stator tooth 20 can be inserted within a respective aperture defined within the stator yoke 18. Through this configuration, the axial stator poles 28 can be formed as a single flexible unit 120 that can be manipulated and installed as a single piece within the stator yoke 18. As with other embodiments, this assembly can then be secured through the use of the second overmold 92 that surrounds the axial stator teeth 20 and the stator yoke 18 to form the unitary structure of the stator core 30.

Referring now to FIGS. 1-10, having described various aspects of the axial flux motor 10, a method 400 is disclosed for forming various aspects of the axial flux motor 10. According to the method 400, a plurality of first laminations 50 are connected to form the first rectilinear member 22 (step 402). A plurality of second laminations 50 are connected to form the second rectilinear member 24 (step 404). As discussed above, the first and second rectilinear members 22, 24 can have a similar size or can be different sized. When sized differently, the difference in size can be accomplished through a different number of similar sized laminations 50 that are included within the first and second rectilinear members 22, 24. The difference in size can also be accomplished through different sized laminations 50 that are used to form the first and second rectilinear members 22, 24.

Referring again to FIGS. 1-10, according to the method 400, the first and second rectilinear members 22, 24 are positioned in the "T" shaped configuration to define a stator tooth 20 (step 406). An overmold material is then disposed over the first and second rectilinear members 22, 24 to define the axial stator pole 28 (step 408). The axial stator pole 28 can then be positioned within the stator yoke 18 to form the stator core 30 (step 410). As discussed above, the process of placing the overmold material over the first and second rectilinear members 22, 24 can be accomplished by overmolding each tooth individually. Alternatively, a set of teeth can be overmolded to form an elongated assembly of axial stator teeth 20 that can be manipulated for installation within the stator yoke 18. In each of these instances, the first and second rectilinear members 22, 24 extend at least partially through the material of the stator yoke 18.

According to various aspects of the device, the axial flux motor 10 can be used within a wide range of mechanisms and appliances 12. Such mechanisms can include, but are not limited to, fans, air handlers, blowers, fluid pumps and other similar mechanical devices. These devices can be incorporated within a wide range of appliances 12 that can include, but are not limited to, laundry appliances, dishwashers, refrigerators, freezers, small appliances, countertop appliances, air handlers, water heaters, ovens, and other similar residential and commercial appliances and fixtures.

According to another aspect of the present disclosure, an electric motor includes a stator yoke. A plurality of stator teeth extend axially from the stator yoke. Each stator tooth includes a first rectilinear member and a second rectilinear member. The plurality of stator teeth are overmolded with a polymeric material to define a plurality of axial stator poles. At least one winding extends around the plurality of axial stator poles. A rotor rotates about a central axis of the stator yoke. The rotor is positioned proximate an axial end of the plurality of stator teeth.

According to another aspect, the rotor is coupled with a rotating member that rotationally operates about the central axis.

According to yet another aspect, the first and second rectilinear members include a plurality of laminations that are oriented perpendicular to the stator yoke.

According to another aspect of the present disclosure, the first rectilinear member and the second rectilinear member are positioned to form an extruded "T" shape that extends from the stator yoke.

According to another aspect, the plurality of axial stator poles are overmolded with the polymeric material to define a single flexible unit that is slidably engaged with the stator yoke.

According to yet another aspect, the single flexible unit includes a plurality of living hinges that are positioned between adjacent axial stator poles of the plurality of axial stator poles.

According to another aspect of the present disclosure, a second overmold extends around the plurality of axial stator poles and the stator yoke.

According to another aspect, the rotor is a ring magnet that is coupled to a fan blade.

According to yet another aspect, the stator yoke is made of powder metal and includes a plurality of apertures for receiving the plurality of stator teeth.

According to another aspect of the present disclosure, an axial flux motor for an appliance includes a stator yoke. A plurality of stator teeth extend from the stator yoke in an axial direction and are positioned about a central rotational axis. Each stator tooth includes a plurality of laminations that extend in the axial direction and form a "T" shaped member. The plurality of stator teeth are overmolded with a polymeric material to define a plurality of axial stator poles. At least one winding extends around the plurality of axial stator poles. A ring-shaped rotor rotates about the central rotational axis of the stator yoke. The rotor is positioned proximate an axial end of the plurality of axial stator poles.

According to another aspect, the "T" shaped member includes a first rectilinear member and a second rectilinear member, and wherein the plurality of laminations of the first and second rectilinear members are in a parallel orientation.

According to yet another aspect, the rotor is coupled with a rotating member that rotationally operates about the central axis.

According to another aspect of the present disclosure, the plurality of axial stator poles are overmolded with the polymeric material to define a single flexible unit that is slidably engaged with the stator yoke.

According to another aspect, the polymeric material of the single flexible unit includes a plurality of living hinges that are positioned between adjacent axial stator poles of the plurality of axial stator poles.

According to yet another aspect, a second overmold extends around the plurality of axial stator poles and the stator yoke.

According to another aspect of the present disclosure, the rotor is a ring magnet that is coupled to a fan blade.

According to another aspect, the stator yoke is made of powdered metal and includes a plurality of apertures for receiving the plurality of stator teeth.

According to yet another aspect, the axial stator poles are coupled with a structural housing for a fluid pump, and the rotor is disposed within the structural housing and the axial stator poles are at least partially outside of the structural housing.

According to another aspect of the present disclosure, a method for forming an axial flux motor includes connecting a plurality of first laminations to form a first rectilinear member. A plurality of second laminations are connected to form a second rectilinear member. The first and second rectilinear members are positioned in a "T" shaped configuration to define a stator tooth. An overmold material is disposed over the first and second rectilinear members to define an axial stator pole. The axial stator pole is positioned within a stator yoke to form a stator core.

According to another aspect, the step of disposing the overmold material over the first and second rectilinear members includes disposing the overmold material over a plurality of stator teeth in configuration. The method further includes forming the elongated configuration into a circular configuration for positioning within the stator yoke.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An axial flux motor for an appliance, the axial flux motor comprising:
   a stator yoke;
   a plurality of stator teeth extending from the stator yoke in an axial direction and positioned about a central rotational axis, wherein the plurality of stator teeth includes a plurality of laminations that extend in the axial direction and form a plurality of T-shaped members;
   an overmold that encapsulates the plurality of stator teeth to form a plurality of axial stator poles, wherein the overmold is a polymeric material, and wherein the overmold includes a plurality of living hinges that are positioned between adjacent axial stator poles of the plurality of axial stator poles; and
   a winding that is disposed around the plurality of axial stator poles, wherein the plurality of living hinges are configured to provide for manipulation of the plurality of axial stator poles between an elongated configuration and a circular configuration, wherein the winding is disposed on the plurality of axial stator poles while in the elongated configuration and the plurality of axial stator poles are held in the circular configuration through engagement of the plurality of T-shaped members with T-shaped apertures of the stator yoke, wherein the overmold corresponds to the plurality of T-shaped members to define at least one step per axial stator pole of the plurality of axial stator poles, wherein the step cooperates with the winding to form a space between the winding and the overmold.

2. The axial flux motor of claim 1, wherein the elongated configuration has an inner edge that includes an undulating shape.

3. The axial flux motor of claim 1, wherein the plurality of living hinges extend outwardly from an outer edge of the plurality of axial stator poles in the elongated configuration.

4. The axial flux motor of claim 1, wherein the plurality of axial stator poles include a plurality of spacing flanges, and wherein each spacing flange directly abuts adjacent spacing flanges within the plurality of spacing flanges with the plurality of axial stator poles in the circular configuration.

5. The axial flux motor of claim 4, wherein the plurality of spacing flanges, with the plurality of axial stator poles in the elongated configuration, are joined by the plurality of living hinges.

6. The axial flux motor of claim 1, wherein the plurality of T-shaped members further comprise a plurality of first rectilinear members and a plurality of second rectilinear members.

7. The axial flux motor of claim 6, wherein each T-shaped member of the plurality of T-shaped members includes only a first rectilinear member of the plurality of first rectilinear members and a second rectilinear member of the plurality of second rectilinear members.

8. The axial flux motor of claim 7, wherein the first rectilinear member and the second rectilinear member are oriented perpendicular with respect to one another, and wherein laminations of the first rectilinear member and the second rectilinear member are oriented in a parallel configuration.

9. The axial flux motor of claim 1, wherein the stator yoke defines the plurality of T-shaped apertures that cooperate with the plurality of axial stator poles in the circular configuration.

10. The axial flux motor of claim 9, wherein the plurality of T-shaped apertures slidably receive the plurality of stator teeth of the plurality of axial stator poles to maintain the circular configuration of the plurality of axial stator poles relative to the stator yoke.

11. The axial flux motor of claim 1, further comprising:
a second overmold that surrounds at least a portion of the overmold, the plurality of axial stator poles, and the stator yoke.

12. The axial flux motor of claim 11, wherein the second overmold includes a bulk molding compound.

13. The axial flux motor of claim 11, wherein the second overmold is configured to attach the plurality of axial stator poles to a structural housing.

14. The axial flux motor of claim 1, further comprising:
a rotor that is positioned proximate axial ends of the plurality of axial stator poles.

15. The axial flux motor of claim 14, wherein the rotor is overmolded within a fan blade assembly.

16. The axial flux motor of claim 14, wherein the rotor is overmolded within an impeller of a fluid pump.

17. The axial flux motor of claim 1, wherein the stator yoke receives the plurality of T-shaped members and maintains the plurality of living hinges in the circular configuration.

18. The axial flux motor of claim 1, wherein the stator yoke is made of at least one of powder metal and steel.

19. The axial flux motor of claim 1, wherein the stator yoke is made of stacked yoke laminations.

20. The axial flux motor of claim 1, wherein the overmold is applied with the plurality of stator teeth in the elongated configuration.

* * * * *